US011624932B2

(12) United States Patent
Muendel et al.

(10) Patent No.: US 11,624,932 B2
(45) Date of Patent: Apr. 11, 2023

(54) ROTARY BEAM SYMMETRIZER

(71) Applicant: Lumentum Operations LLC, Milpitas, CA (US)

(72) Inventors: Martin H. Muendel, Oakland, CA (US); Patrick Gregg, Santa Clara, CA (US)

(73) Assignee: Lumentum Operations LLC, San Jose, CA (US)

( * ) Notice: Subject to any disclaimer, the term of this patent is extended or adjusted under 35 U.S.C. 154(b) by 756 days.

(21) Appl. No.: 16/592,488

(22) Filed: Oct. 3, 2019

(65) Prior Publication Data

US 2020/0400966 A1 Dec. 24, 2020

Related U.S. Application Data

(60) Provisional application No. 62/864,333, filed on Jun. 20, 2019.

(51) Int. Cl.
*G02B 27/28* (2006.01)
*B23K 26/064* (2014.01)
(Continued)

(52) U.S. Cl.
CPC .......... *G02B 27/286* (2013.01); *B23K 26/064* (2015.10); *B23K 26/073* (2013.01);
(Continued)

(58) Field of Classification Search
CPC .. G02B 5/3083; G02B 27/283; G02B 5/3025; G02B 27/286; G02B 5/3016; G02B 27/28; G02B 30/25; G02B 5/3058; G02B 27/281; G02B 1/08; G02B 5/305; G02B 5/23; G02B 5/3033; G02B 5/3041; G02B 26/02; G02B 27/285; G02B 5/0841; G02B 1/02; G02B 1/04; G02B 27/145; G02B 27/288; G02B 27/0093; G02B 6/0055; G02B 6/0056; G02B 6/4246; G02B 26/001; G02B 27/149; G02B 5/1809; G02B 5/3066; G02B 5/3075; G02B 1/06; G02B 5/30;
(Continued)

(56) References Cited

U.S. PATENT DOCUMENTS

| 2006/0176542 A1* | 8/2006 | Muro ...................... G02F 1/139 359/290 |
| 2013/0128330 A1* | 5/2013 | Frankel ................ G02B 27/286 385/11 |
| 2017/0304946 A1* | 10/2017 | Shibazaki ............... B22F 12/45 |

* cited by examiner

*Primary Examiner* — Collin X Beatty
*Assistant Examiner* — Grant A Gagnon
(74) *Attorney, Agent, or Firm* — Harrity & Harrity, LLP

(57) ABSTRACT

An optical device may include a polarization splitter to split a unidirectional rotary optical beam into a first rotary optical beam having a first polarization state and a second rotary optical beam having a second polarization state. The unidirectional rotary optical beam and the second rotary optical beam may have optical power with a first direction of spatial rotation. The optical device may include a reflective element to reverse a parity of the first rotary optical beam in association with causing optical power of the first rotary optical beam to have a second direction of spatial rotation. The optical device may include a polarization combiner to, after reversal of the parity of the first rotary optical beam, combine the first rotary optical beam and the second rotary optical beam to create a bi-directional rotary optical beam having the first polarization state and the second polarization state.

20 Claims, 6 Drawing Sheets

(51) Int. Cl.
  *B23K 26/073* (2006.01)
  *B23K 26/08* (2014.01)
  *B23K 26/38* (2014.01)
(52) U.S. Cl.
  CPC .......... *B23K 26/0884* (2013.01); *B23K 26/38* (2013.01); *G02B 27/283* (2013.01)
(58) Field of Classification Search
  CPC .... G02B 6/0046; G02B 6/005; G02B 6/0096; G02B 6/272; G02B 1/10; G02B 1/11; G02B 21/0092; G02B 27/0101; G02B 27/0927; G02B 27/1046; G02B 27/1073; G02B 27/144; G02B 27/48; G02B 5/04; G02B 5/0883; G02B 5/26; G02B 5/32; G02B 6/2746; G02B 6/2766; G02B 6/32; G02B 6/34; G02B 6/4208; G02B 6/4214; G02B 1/14; G02B 13/143; G02B 21/0068; G02B 26/105; G02B 27/0025; G02B 27/1006; G02B 30/27; G02B 30/56; G02B 5/00; G02B 6/105; G02B 6/274; G02B 6/2937; G02B 6/2938; G02B 6/305; G02B 6/4206; G02B 6/43; G02B 1/115; G02B 13/24; G02B 17/0892; G02B 19/0028; G02B 2027/012; G02B 2027/0132; G02B 21/0016; G02B 23/00; G02B 26/10; G02B 27/0172; G02B 27/022; G02B 27/095; G02B 27/0977; G02B 27/1053; G02B 27/106; G02B 27/108; G02B 27/142; G02B 27/143; G02B 27/642; G02B 3/0056; G02B 5/008; G02B 5/0278; G02B 5/201; G02B 5/3008; G02B 6/0008; G02B 6/12007; G02B 6/126; G02B 6/2713; G02B 6/2773; G02B 6/2848; G02B 6/29302; G02B 6/29311; G02B 6/29362; G02B 6/29395; G02B 6/327; G02B 7/008; G02B 7/182; G02B 1/005; G02B 1/041; G02B 1/12; G02B 13/001; G02B 13/0045; G02B 13/16; G02B 17/00; G02B 17/061; G02B 17/08; G02B 17/0812; G02B 19/0019; G02B 19/0033; G02B 19/0061; G02B 2006/0098; G02B 2006/12097; G02B 2006/12107; G02B 2006/12147; G02B 2006/12152; G02B 2027/011; G02B 2027/0114; G02B 2027/0118; G02B 2027/0125; G02B 2027/0136; G02B 2027/0178; G02B 2027/0194; G02B 21/0004; G02B 21/002; G02B 21/0032; G02B 21/0044; G02B 21/0048; G02B 21/0056; G02B 21/06; G02B 21/125; G02B 21/14; G02B 2207/117; G02B 23/12; G02B 26/00; G02B 26/008; G02B 26/0825; G02B 26/0833; G02B 26/101; G02B 26/12; G02B 26/123; G02B 26/124; G02B 27/0018; G02B 27/0081; G02B 27/02; G02B 27/026; G02B 27/09; G02B 27/0944; G02B 27/0961; G02B 27/0988; G02B 27/0994; G02B 27/1026; G02B 27/1033; G02B 27/1093; G02B 27/123; G02B 27/141; G02B 27/148; G02B 27/18; G02B 27/42; G02B 27/4233; G02B 27/46; G02B 27/60; G02B 3/0012; G02B 3/0043; G02B 3/0062; G02B 3/0087; G02B 3/08; G02B 3/10; G02B 30/26; G02B 30/30; G02B 30/34; G02B 5/003; G02B 5/02; G02B 5/0215; G02B 5/0236; G02B 5/0252; G02B 5/0257; G02B 5/0263; G02B 5/0294; G02B 5/08; G02B 5/124; G02B 5/18; G02B 5/1814; G02B 5/1819; G02B 5/1857; G02B 5/1866; G02B 5/20; G02B 5/28; G02B 5/284; G02B 5/285; G02B 5/287; G02B 5/288; G02B 5/3091; G02B 6/00; G02B 6/0005; G02B 6/0018; G02B 6/0028; G02B 6/003; G02B 6/0038; G02B 6/0051; G02B 6/0053; G02B 6/06; G02B 6/08; G02B 6/12011; G02B 6/12014; G02B 6/12023; G02B 6/122; G02B 6/124; G02B 6/14; G02B 6/264; G02B 6/266; G02B 6/2726; G02B 6/276; G02B 6/278; G02B 6/2786; G02B 6/2813; G02B 6/29317; G02B 6/2934; G02B 6/29358; G02B 6/29361; G02B 6/29386; G02B 6/29392; G02B 6/3552; G02B 6/356; G02B 6/3592; G02B 6/3594; G02B 6/3833; G02B 6/42; G02B 6/4204; G02B 9/34; B23K 26/0604; B23K 26/066; B23K 26/073; B23K 26/0734
  USPC ...................................................... 359/489
  See application file for complete search history.

ROTARY BEAM SYMMETRIZER

RELATED APPLICATION

This application claims priority under 35 U.S.C. § 119 to U.S. Provisional Patent Application No. 62/864,333, filed on Jun. 20, 2019, the content of which is incorporated by reference herein in its entirety.

TECHNICAL FIELD

The present disclosure relates to an optical device associated with providing a rotary optical beam and, more particularly, to an optical device for providing a bi-directional rotary optical beam having optical power with a first direction of spatial rotation and optical power with a second direction of spatial rotation.

BACKGROUND

A beam profile of an optical beam has a significant impact on processing performance associated with material processing performed using the optical beam. For example, an optical beam with an annular beam profile can enable improved metal cutting, welding, and/or other type of materials processing in which a beam is scanned along a surface. In some cases, an optical beam with an annular beam shape can be generated in an optical fiber (i.e., without any free-space optics). In such a case, the generated optical beam may be a rotary optical beam (i.e., an optical beam that propagates in the optical fiber in a helical direction), which provides an optical beam with an annular beam shape after exiting the optical fiber. The rotary character of the optical beam can be preserved (e.g., when the optical beam exits the optical fiber) such that a laser spot projected from the optical fiber onto a workpiece, for example, shows an annular beam profile with sharp edges and high beam quality. Thus, an optical beam with an annular beam shape may be generated, thereby facilitating improved material processing.

SUMMARY

According to some possible implementations, an optical device may include a polarization splitter to split a unidirectional rotary optical beam into a first rotary optical beam having a first polarization state and a second rotary optical beam having a second polarization state, wherein the unidirectional rotary optical beam and the second rotary optical beam have optical power with a first direction of spatial rotation; a reflective element to reverse a parity of the first rotary optical beam in association with causing optical power of the first rotary optical beam to have a second direction of spatial rotation, wherein the second direction of spatial rotation is a direction of spatial rotation that is opposite to the first direction of spatial rotation; and a polarization combiner to, after reversal of the parity of the first rotary optical beam, combine the first rotary optical beam and the second rotary optical beam to create a bi-directional rotary optical beam having the first polarization state and the second polarization state, and wherein the bi-directional rotary optical beam has optical power with the first direction of spatial rotation and optical power with the second direction of spatial rotation.

According to some possible implementations, a method may include splitting a unidirectional rotary optical beam into a first rotary optical beam having a first polarization state and a second rotary optical beam having a second polarization state, wherein the unidirectional rotary optical beam and the second rotary optical beam have optical power with a first direction of spatial rotation; causing optical power of the first rotary optical beam to have a second direction of spatial rotation, the second direction of spatial rotation being a direction of spatial rotation that is opposite to the first direction of spatial rotation; and combining, after causing the optical power of the first rotary optical beam to have the second direction of spatial rotation, the first rotary optical beam and the second rotary optical beam to create a bi-directional rotary optical beam, wherein the bi-directional rotary optical beam has both the first polarization state and the second polarization state, and wherein the bi-directional rotary optical beam has optical power with the first direction of spatial rotation and optical power with the second direction of spatial rotation.

According to some possible implementations, a system may include an optical input to receive an input rotary optical beam having optical power with a first direction of spatial rotation; a splitter to split the input rotary optical beam into a first rotary optical beam and a second rotary optical beam, wherein the first rotary optical beam has a first linear polarization state, and wherein the second rotary optical beam has a second linear polarization state and optical power with the first direction of spatial rotation, wherein the first linear polarization state and the second linear polarization state are orthogonal linear polarization states; a set of reflectors to cause the optical power of the first rotary optical beam to have a second direction of spatial rotation, wherein the second direction of spatial rotation is a direction of spatial rotation that is opposite to the first direction of spatial rotation; and a combiner to receive the first rotary optical beam and the second rotary optical beam and output an output rotary optical beam, wherein the output rotary optical beam has the first linear polarization state and the second linear polarization state, and wherein the output rotary optical beam has optical power with the first direction of spatial rotation and optical power with the second direction of spatial rotation.

DETAILED DESCRIPTION

The following detailed description of example implementations refers to the accompanying drawings. The same reference numbers in different drawings may identify the same or similar elements.

As described above, a rotary optical beam can be used in an application such as metal cutting, welding, and/or other type of materials processing in which a beam is scanned along a surface. If a unidirectional rotary optical beam is used (i.e., a beam having optical power with one predominant direction of spatial rotation), a laser-material interaction on the two facing sides of the scan may be different, depending on whether the scan direction is aligned with or opposing the optical rotation direction. Therefore, there may be a need to convert a unidirectional rotary optical beam into a bi-directional rotary beam (i.e., a beam having some optical power with a first direction of spatial rotation and some optical power with a second (opposite) direction of spatial rotation) that interacts with both facing sides of the processed material.

Figure 1A:
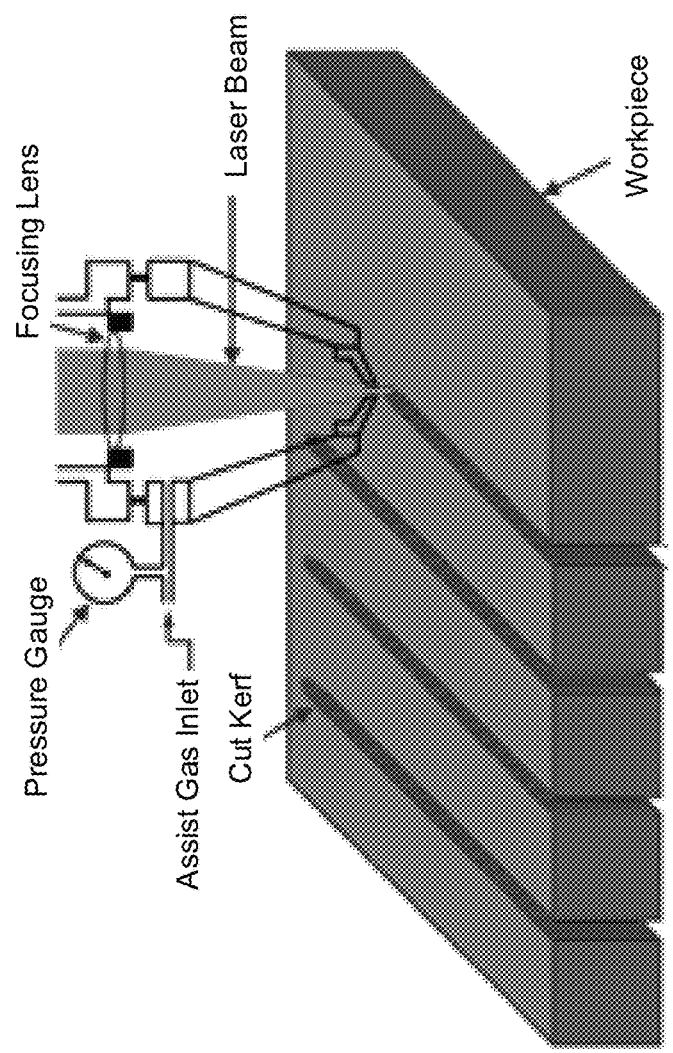
FIG. 1A is a diagram illustrating an example of a laser beam cutting a workpiece.
Figure 1B:
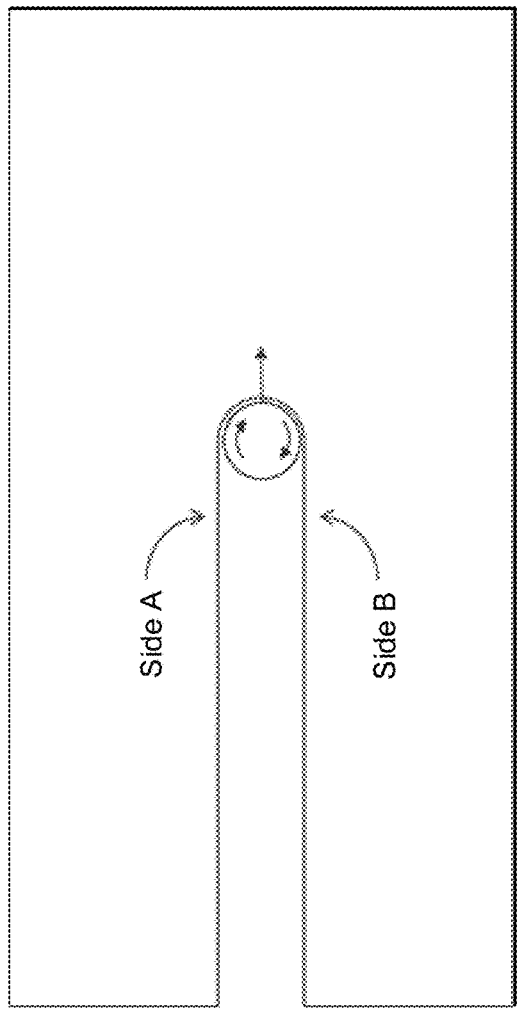
FIG. 1B is an illustration of different cut surface interactions in a case in which material processing is performed using a unidirectional rotary optical beam.

Consider an example of laser cutting, where a laser beam impinges on one surface of a workpiece and penetrates the workpiece. FIG. 1A shows an example of a laser beam cutting a workpiece. In FIG. 1A, the laser beam is scanned relative to the workpiece (e.g., by moving the laser and/or the workpiece) to generate a cut in the workpiece. Here, the sides of the beam interact with the cut surfaces of the material that are being generated. If the laser beam is a unidirectional rotary optical beam, then the spatial rotation, in conjunction with the direction of the scan, may cause the two cut surfaces to interact differently with the laser beam. FIG. 1B is a schematic illustration of the different cut surface interactions when material processing is performed using a unidirectional rotary optical beam.

In the example shown in FIG. 1B, the laser beam is rotating clockwise and is being scanned from left to right with respect to the workpiece. It can be seen that for side A (the top cut surface illustrated in FIG. 1B), the rotation direction and the scan direction are aligned, whereas for side B (the bottom cut surface illustrated in FIG. 1B) the rotation direction and the scan direction are opposite. It is therefore possible that the cut quality, surface finish, achievable cutting speed, and/or the like, may be different between side A and side B and, therefore, that one or the other orientation may be preferred. Which orientation is preferred may vary depending on a type of the material, a thickness of the material, a power of the laser, the use of assist gases, cutting speed, and/or one or more other factors. For improved flexibility in material processing, it may be advantageous to have a laser beam that retains the favorable characteristics of the rotary optical beam, while not interacting significantly differently with the material on the two sides of the laser beam during processing.

Some implementations described herein provide a rotary beam symmetrizer capable of converting a unidirectional rotary optical beam to a bi-directional rotary optical beam in which some optical power is rotating in one direction and some optical power is rotating in an opposite direction.

Figure 2:
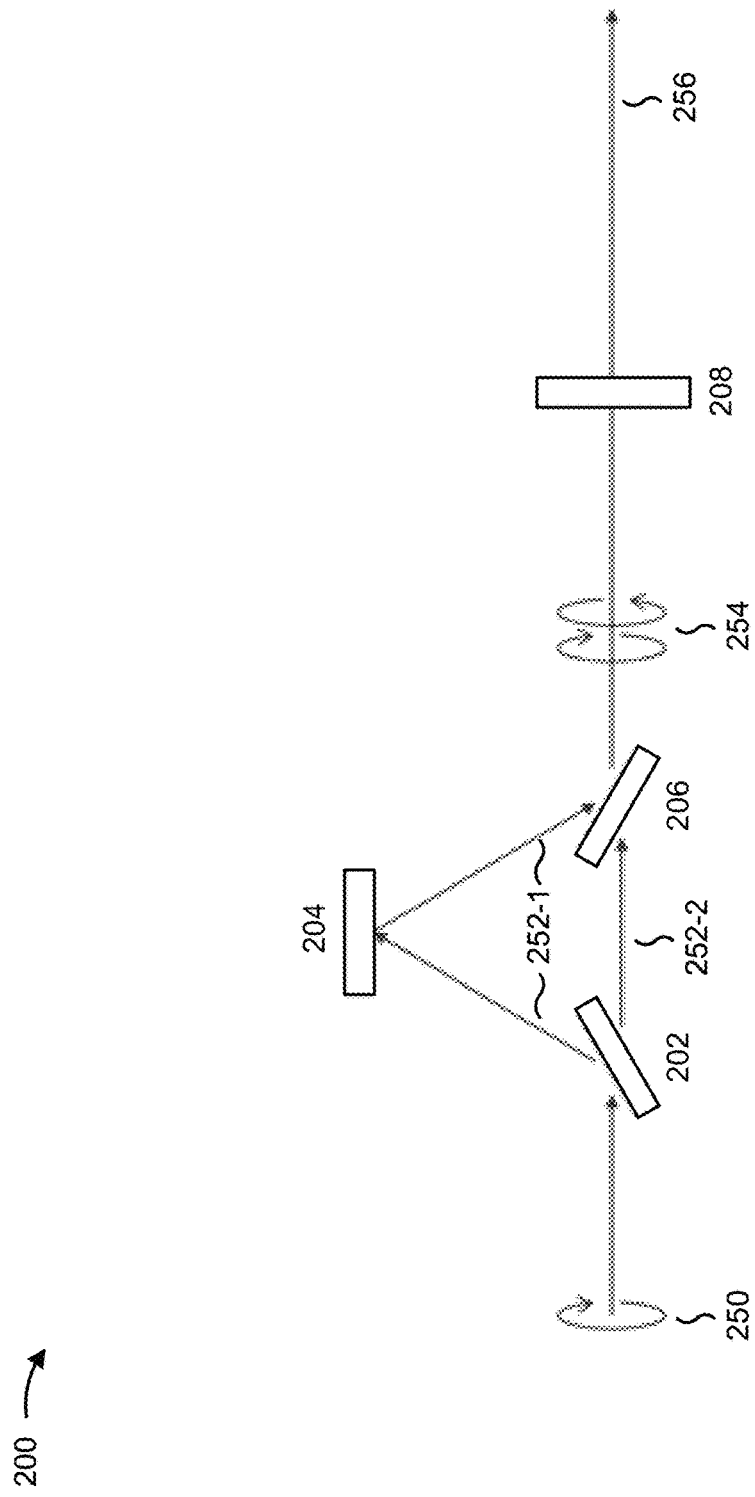
FIG. 2 is a diagram of an example implementation of a rotary beam symmetrizer capable of converting a unidirectional rotary optical beam to a bi-directional rotary optical beam, as described herein.

FIG. 2 is a diagram of an example implementation of a rotary beam symmetrizer 200 capable of converting a unidirectional rotary optical beam to a bi-directional rotary optical beam. As shown in FIG. 2, rotary beam symmetrizer 200 may include an optical device comprising a polarization splitter 202, a reflective element 204, a polarization combiner 206, and a polarization convertor 208. Here, unidirectional rotary optical beam 250 may have optical power with a first direction of spatial rotation (e.g., unidirectional rotary optical beam 250 may be a unidirectional rotary optical beam with a first direction of spatial rotation).

Polarization splitter 202 includes an optical element to split unidirectional rotary optical beam 250 into a first rotary optical beam 252-1 having a first polarization state and a second rotary optical beam 252-2 having a second polarization state.

In some implementations, polarization splitter 202 may split unidirectional rotary optical beam 250 approximately in half such that first rotary optical beam 252-1 and second rotary optical beam 252-2 have approximately equal optical powers (e.g., optical powers with a difference of less than 5% to 10%). Alternatively, in some implementations, polarization splitter 202 may split unidirectional rotary optical beam 250 such that first rotary optical beam 252-1 and second rotary optical beam 252-2 do not have approximately equal optical powers.

In some implementations, first rotary optical beam 252-1 and second rotary optical beam 252-2 may be linearly-polarized beams (e.g., having an s-polarization and a p-polarization). In some implementations, the first polarization state may be a first linear polarization and the second polarization state may be a second linear polarization, where the first linear polarization and the second linear polarization are orthogonal linear polarizations. Alternatively, in some implementations, the first polarization state may be a first non-linear polarization (e.g., a circular polarization, an elliptical polarization) and the second polarization state may be a second non-linear polarization, wherein the first non-linear polarization and the second non-linear polarization are orthogonal non-linear polarizations.

In some implementations, unidirectional rotary optical beam 250 may be unpolarized. In such a case polarization splitter 202 may automatically generate approximately equal portions of unidirectional rotary optical beam 250 on passing through polarization splitter 202. Alternatively, unidirectional rotary optical beam 250 may be polarized or partially polarized, in which case a polarization axis of unidirectional rotary optical beam 250 may be aligned with polarization splitter 202 in order to generate two polarized beams of approximately equal optical power. In a case where unidirectional rotary optical beam 250 is a linearly polarized optical beam, for example, the polarization axis should be oriented at approximately 45 degrees relative to axes of polarization splitter 202 in order to generate equal powers in first rotary optical beam 252-1 and second rotary optical beam 252-2. However, any orientation angle of polarization splitter 202 may be used so long as polarization splitter 202 and polarization combiner 206 have opposite orientations. In some implementations, polarization splitter 202 may be configured to split unidirectional rotary optical beam 250 such that first rotary optical beam 252-1 and second rotary optical beam 252-2 do not have approximately equal optical powers.

As shown in FIG. 2, polarization splitter 202 may direct (e.g., by reflection) first rotary optical beam 252-1 on an optical path toward reflective element 204, and may direct (e.g., by transmission) second rotary optical beam 252-2 on an optical path toward polarization combiner 206. Here, after reflection by polarization splitter 202 and prior to reflection by reflective element 204, first rotary optical beam 252-1 may have optical power with a second direction of spatial rotation (e.g., a direction of spatial rotation that is opposite to the first direction of spatial rotation), while optical power of second rotary optical beam 252 maintains the first direction of spatial rotation.

Reflective element 204 includes an optical element to reverse a parity of first rotary optical beam 252-1. For example, reflective element 204 may include one reflector (e.g., a high reflector (HR)), or any odd number of reflectors. As shown in FIG. 2, first rotary optical beam 252-1 may reflected by reflective element 204. Here, first rotary optical beam 252-1 may, after reflection by reflective element 204 and prior to reflection by polarization combiner 206, once again have optical power with the first direction of spatial rotation. As noted below, after reflection by polarization combiner 206, first rotary optical beam 252-1 (after being combined with second rotary optical beam 252-2 to form bi-directional rotary optical beam 254) may have optical power with the second direction of spatial rotation. Here, the odd number of reflections of first rotary optical beam 252-1 provided by rotary beam symmetrizer 200 (e.g., three reflections, in this example) reverses the parity of rotary optical beam 252-1 such that a direction of spatial rotation of first rotary optical beam 252-1 is opposite to a direction of spatial rotation of second rotary optical beam 252-2.

In some implementations, as shown in FIG. 2, second rotary optical beam 252-2 may be directed straight to polarization combiner 206 (i.e., without any reflection). Therefore, at polarization combiner 206, second rotary optical beam 252-2 may have optical power with the first direction of spatial rotation. Alternatively, second rotary optical beam 252-2 may be reflected by an even number of reflectors on an optical path to polarization combiner 206. Every bounce from a reflector causes a reversal of parity on the beam being reflected, causing the direction of spatial rotation to be reversed. Here, because the optical path of first rotary optical beam 252-1 has an odd number of parity reversals and the optical path of second rotary optical beam 252-2 has zero or an even number of parity reversals, first rotary optical beam 252-1 and second rotary optical beam 252-2 at polarization combiner 206 have opposite directions of spatial rotation.

Polarization combiner 206 includes an optical element to combine first rotary optical beam 252-1 beam and second rotary optical beam 252-2 to create bi-directional rotary optical beam 254 having the first polarization state and the second polarization state. Here, after reflection by polarization combiner 206 during combination with second rotary optical beam 252-2, first rotary optical beam 252-1 may again have optical power with the second direction of spatial rotation. Because first rotary optical beam 252-1 has optical power with the second direction of spatial rotation, and second rotary optical beam 252-2 has optical power with the first direction of spatial rotation, bi-directional rotary optical beam 254 has optical power with the first direction of spatial rotation and optical power with the second direction of spatial rotation. In some implementations, bi-directional rotary optical beam 254 may have approximately equal portions of optical power in each of the first and second directions of spatial rotation and, therefore, may be approximately symmetric in terms of net rotation.

In some implementations, after combining at polarization combiner 206, bi-directional rotary optical beam 254 may have asymmetry in terms of polarization. For example, since one of the directions of spatial rotation of bi-directional rotary optical beam 254 is associated with one polarization, and the other direction of spatial rotation of bi-directional rotary optical beam 254 is associated with another polarization, there may be polarization asymmetry within bi-directional rotary optical beam 254. This asymmetry may cause differences upon the workpiece depending on, for example, how the scan direction is aligned relative to the two polarizations (e.g., since material absorption can depend on the polarization state and direction).

Therefore, in some implementations, rotary beam symmetrizer 200 may include polarization convertor 208. Polarization convertor 208 may include, for example, a quarter-wave plate. In some implementations, polarization convertor 208 may include an optical element to convert the first polarization state in bi-directional rotary optical beam 254 to a third polarization state, and convert the second polarization state in bi-directional rotary optical beam 254 to a fourth polarization state. In some implementations, the third polarization state and the fourth polarization state may be rotationally symmetric orthogonal polarization states. In some implementations, polarization convertor 208 may include a set of polarization-sensitive optics such that the third polarization state and the fourth polarization state are final polarization states to be delivered to the workpiece.

In some implementations, polarization convertor 208 may be arranged on an optical path of bi-directional rotary optical beam 254 after polarization combiner 206. In some implementations, polarization convertor 208 may be rotated to be oriented at 45 degrees relative to an axis of polarization combiner 206. As a result, two linear polarizations emanating from polarization combiner 206 can be converted to circular polarizations, which are rotationally symmetric. Therefore, the resulting polarization converted bi-directional rotary optical beam 256 beam would include two rotary portions, each with its own circular polarization, therefore with full rotational symmetry. That is, in some implementations, the third polarization state and fourth polarization state are opposing circular polarizations. Other polarizations, such as elliptical polarizations which are rotationally symmetric, are also contemplated.

In some implementations, depending upon the orientation of the 45 degree angle of polarization convertor 208 (e.g., whether polarization convertor 208 is oriented at +45 degrees or −45 degrees), the spatial and polarization rotation directions of the two beams that make up polarization converted bi-directional rotary optical beam 256 can be chosen to be aligned or opposite. For example, with one orientation of polarization convertor 208, a clockwise rotational beam can have a clockwise circular polarization, and a counterclockwise rotational beam can have a counterclockwise circular polarization. The opposite orientation of polarization convertor 208 (i.e., rotating polarization convertor 208 by +/−90 degrees) causes the clockwise rotational beam to have counterclockwise polarization, and the counterclockwise beam to have clockwise polarization. These two options are referred to herein as rotation/polarization aligned or anti-aligned. Thus, in some implementations, polarization convertor 208 may be oriented such that the first direction of spatial rotation is aligned with a direction of the third polarization state, and such that the second direction of spatial rotation is aligned with a direction of the fourth polarization state. Alternatively, polarization convertor 208 may be oriented such that the first direction of spatial rotation is anti-aligned with a direction of the third polarization state, and such that the second direction of spatial rotation is anti-aligned with a direction of the fourth polarization state.

Both of these options are fully symmetric with respect to the scan direction and may provide symmetric processing results. However, because both the rotation and the polarization play a role in how the laser beam interacts with the workpiece, it is possible that one or the other option (e.g., rotation/polarization aligned or rotation/polarization anti-aligned) may provide superior processing results (e.g., in terms of processing speed, processing quality, and/or the like) depending on, for example, a type of the material being processed, a geometry, a laser power, and/or the like.

In some applications, it may be desirable to change from rotation/polarization aligned to rotation/polarization anti-aligned (e.g., when changing from one material being processed to another on the same cutting machine, or even dynamically during one cutting or other processing operation). Therefore, in some implementations, an orientation of polarization convertor 208 may be adjustable in association with selectively aligning or anti-aligning the first direction of spatial rotation with a direction of the third polarization state and the second direction of spatial rotation with a direction of the fourth polarization state. If a speed is on the order of approximately 100 milliseconds or longer, then this may be achieved by rotating polarization convertor 208 by 90 degrees. Alternatively, for faster speeds, an electronically actuated adjustment may be used—for example, polarization convertor 208 may be an electro-optic modulated waveplate.

In yet other applications, it may be determined that full polarization symmetrization is not required (or desired) in a polarization converted bi-directional rotary optical beam 256. In such a case, polarization convertor 208 may be adjusted to generate polarization states other than perfect circular polarization by altering a retardance or orientation of the axis, or polarization convertor 208 can be omitted (e.g., to leave the two orthogonal linear polarization states).

In some implementations, rotary beam symmetrizer 200 may be implemented in a materials-processing system in, for example, a process head (e.g., an assembly directly adjacent to the workpiece), an optical delivery fiber (e.g., at an input end of the optical delivery fiber), or a splice box. In the case of implementation in an optical delivery fiber, the optical delivery fiber may preferably have a round core (e.g., circular or annular, to preserve the rotational character of the beam) and either low birefringence or circular birefringence (e.g., to preserve the launched circular polarization states).

The number and arrangement of elements shown in FIG. 2 are provided as an example. In practice, rotary beam symmetrizer 200 may include additional elements, fewer elements, different elements, or differently arranged elements than those shown in FIG. 2. Additionally, or alternatively, a set of elements (e.g., one or more elements) of rotary beam symmetrizer 200 may perform one or more functions described as being performed by another set of elements of rotary beam symmetrizer 200.

As described above, there may be a cutting application in which a rotary optical beam has a preferred orientation with respect to the target material (e.g., side A versus side B in FIG. 1B). In such a case, it may be advantageous to spatially offset first rotary optical beam 252-1 and second rotary optical beam 252-2 such that each side of bi-directional rotary optical beam 254 (or polarization converted bi-directional rotary optical beam 256, when rotary beam symmetrizer includes polarization convertor 208) is dominated by a desired direction of rotation.

Figure 3:
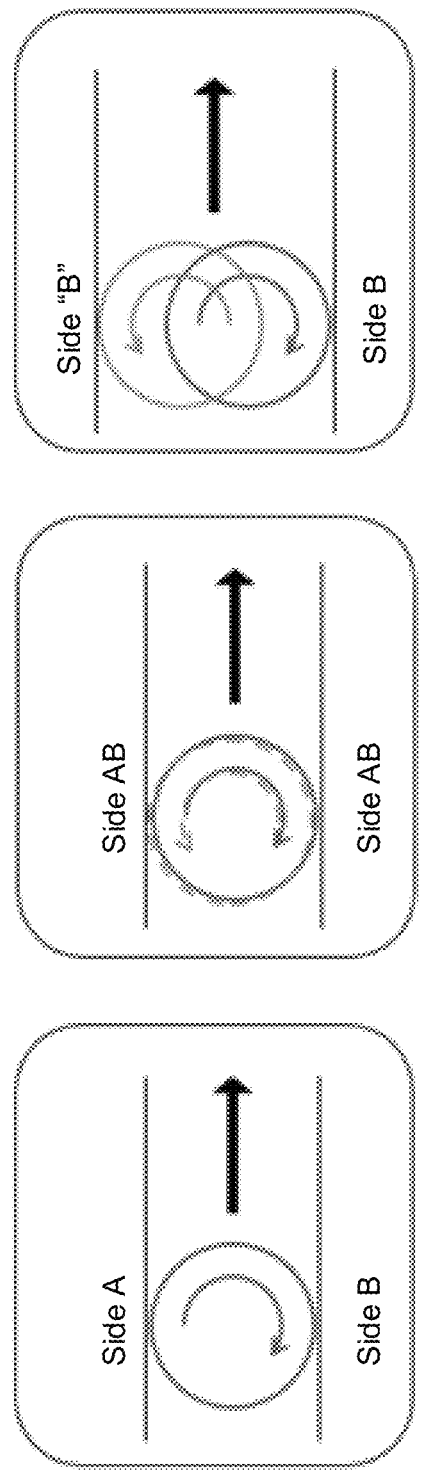
FIG. 3 includes diagrams associated with illustrating a spatial offset between portions of a bi-directional rotary optical beam.

FIG. 3 includes diagrams associated with illustrating a spatial offset between portions of a bi-directional rotary optical beam 254. The left diagram of FIG. 3 illustrates a case with a unidirectional rotary optical beam 250 in which side A and side B experience different orientations of rotation with cut movement, as described above. The center diagram of FIG. 3 illustrates a case which a bi-directional rotary optical beam (e.g., bi-directional rotary optical beam 254 or polarization converted bi-directional rotary optical beam 256) is provided without an offset. Here, the bi-directional rotary optical beam is bi-directional, and both sides of the cut may experience equal orientations of beam rotation and cut orientation. The right schematic of FIG. 3 illustrates a case in which portions of the bi-directional rotary optical beam 254 are spatially offset from each other. As shown, due to the spatial offset, each edge can be dominated by the handedness of rotation which is preferred for the material. Because optical beams have tails (i.e., lengths over which the local power decreases to zero), the offset need only be large enough that the local power of the desired orientation overrides the local power in the tails of the undesired beam (e.g., rather than requiring complete spatial separation).

As indicated above, FIG. 3 is provided merely as an example for illustrative purposes. Other examples may differ from what is described with regard to FIG. 3.

Figure 4:
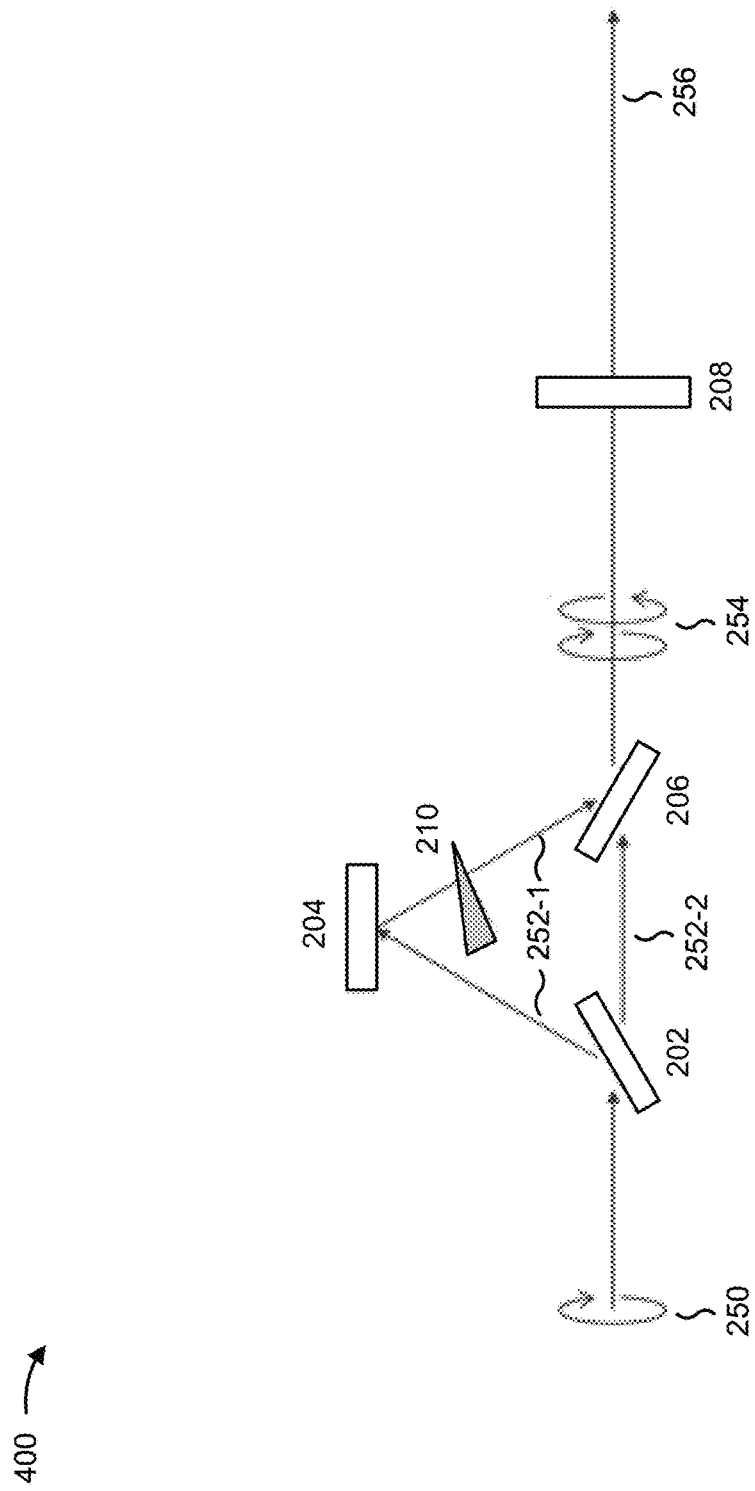
FIG. 4 is a diagram of an example implementation of a rotary beam symmetrizer capable of introducing a spatial offset between a first polarization state and a second polarization state within a bi-directional rotary optical beam, as described herein.

In some implementations, to achieve a spatial offset as illustrated in the right diagram of FIG. 3, rotary beam symmetrizer 200 may include a rotating optic. FIG. 4 is a diagram of an example implementation of rotary beam symmetrizer 400 capable of introducing a spatial offset between a first polarization state and a second polarization state within a bi-directional rotary optical beam (e.g., bi-directional rotary optical beam 254, polarization converted bi-directional rotary optical beam 256). As shown in FIG. 4, rotary beam symmetrizer 400 may include optical elements similar to those included in rotary beam symmetrizer 200, and may further include a rotating optic 210. As shown, in some implementations, rotating optic 210 may be arranged on an optical path of first rotary optical beam 252-1 between reflective element 204 and polarization combiner 206.

Rotating optic 210 includes an optical element to introduce an angular shift between first rotary optical beam 252-1 and second rotary optical beam 252-2, in association with causing a spatial offset between the first polarization state and the second polarization state within bi-directional rotary optical beam 254. For example, in the case of implementation of rotary beam symmetrizer 400 within a cutting head, rotating optic 210 may include a rotating wedge. In some implementations, the rotating wedge may be a prism that can be mechanically rotated to introduce the angular shift between first rotary optical beam 252-1 and second rotary optical beam 252-2. Here, the angular shift results in a spatial offset between portions of bi-directional rotary optical beam 254 (or polarization converted bi-directional rotary optical beam 256) on the workpiece. As rotating optic 210 is rotated, the orientation of the spatial offset may be changed to optimize material processing conditions. Possible orientations of the spatial offset include the offset being between beams in a direction perpendicular to the cut direction (e.g., as illustrated in the right diagram of FIG. 3), the offset causing the beams to be staggered in orientation with respect to the cut direction, and/or the like. Such an implementation retains the possible advantages of selection of dominant orientation with respect to cut direction, and beam rotation with respect to polarization rotation, as described above.

In some implementations, an orientation of rotation of rotating optic 210 may be adjustable in association with controlling the spatial offset. Additionally, or alternatively, an orientation of rotation of rotating optic 210 may be synchronized with translation optics of a cutting head.

The number and arrangement of elements shown in FIG. 4 are provided as an example. In practice, rotary beam symmetrizer 400 may include additional elements, fewer elements, different elements, or differently arranged elements than those shown in FIG. 4. Additionally, or alternatively, a set of elements (e.g., one or more elements) of rotary beam symmetrizer 400 may perform one or more functions described as being performed by another set of elements of rotary beam symmetrizer 400.

Figure 5:
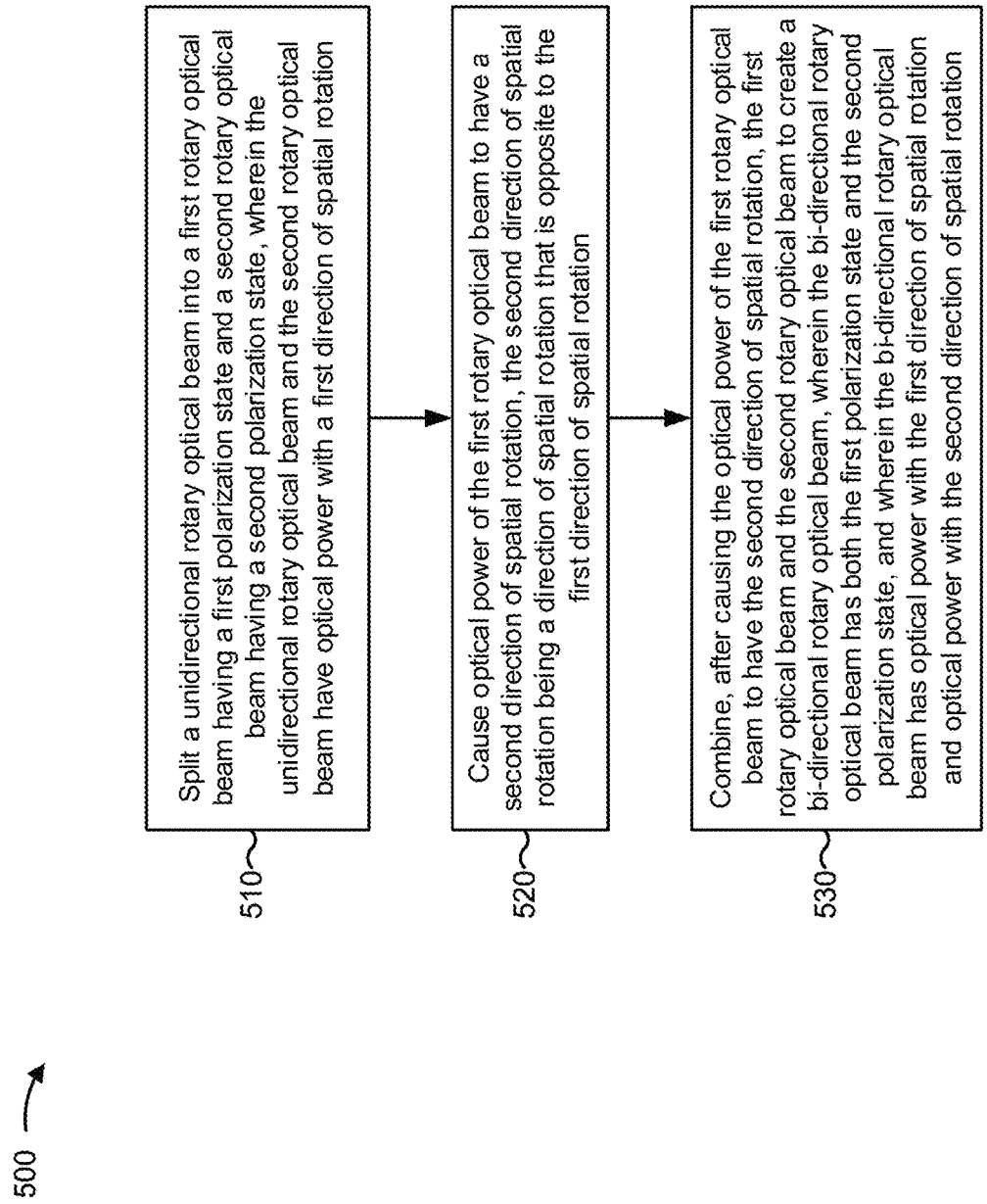
FIG. 5 is a flowchart of an example process for converting a unidirectional rotary optical beam to a bi-directional rotary optical beam, as described herein.

FIG. 5 is a flowchart of an example process 500 for converting a unidirectional rotary optical beam 250 to a bi-directional rotary optical beam 254, as described herein.

As shown in FIG. 5, process 500 may include splitting a unidirectional rotary optical beam into a first rotary optical beam having a first polarization state and a second rotary optical beam having a second polarization state, wherein the unidirectional rotary optical beam and the second rotary optical beam have optical power with a first direction of spatial rotation (block 510). For example, polarization splitter 202 may split unidirectional rotary optical beam 250 into first rotary optical beam 252-1 having a first polarization state and second rotary optical beam 252-2 having a second polarization state, as described above. In some implementations, unidirectional rotary optical beam 250 and second rotary optical beam 252-2 have optical power with a first direction of spatial rotation.

As further shown in FIG. 5, process 500 may include causing optical power of the first rotary optical beam to have a second direction of spatial rotation, the second direction of spatial rotation being a direction of spatial rotation that is opposite to the first direction of spatial rotation (block 520). For example, reflective element 204 may cause optical power of first rotary optical beam 252-1 to have a second direction of spatial rotation, the second direction of spatial rotation being a direction of spatial rotation that is opposite to the first direction of spatial rotation, as described above.

As further shown in FIG. 5, process 500 may include combining, after causing the optical power of the first rotary optical beam to have the second direction of spatial rotation, the first rotary optical beam and the second rotary optical beam to create a bi-directional rotary optical beam, wherein the bi-directional rotary optical beam has both the first polarization state and the second polarization state, and wherein the bi-directional rotary optical beam has optical power with the first direction of spatial rotation and optical power with the second direction of spatial rotation (block 530). For example, polarization combiner 206 may combine, after causing the optical power of first rotary optical beam 252-1 to have the second direction of spatial rotation, first rotary optical beam 252-1 and second rotary optical beam 252-2 to create bi-directional rotary optical beam 254, as described above. In some implementations, bi-directional rotary optical beam 254 has both the first polarization state and the second polarization state. In some implementations, bi-directional rotary optical beam 254 has optical power with the first direction of spatial rotation and optical power with the second direction of spatial rotation.

Process 500 may include additional implementations, such as any single implementation or any combination of implementations described below and/or in connection with one or more other processes described elsewhere herein.

In a first implementation, process 500 may include converting (e.g., by polarization convertor 208) the first polarization state in bi-directional rotary optical beam 254 to a third polarization state, and converting the second polarization state in bi-directional rotary optical beam 254 to a fourth polarization state, wherein the third polarization state and the fourth polarization state are rotationally symmetric polarization states. In some implementations, the third polarization state and the fourth polarization state are opposing circular polarizations.

In a second implementation, process 500 may include selectively causing either: the first direction of spatial rotation to be aligned with a direction of the third polarization state and the second direction of spatial rotation to be aligned with a direction of the fourth polarization state; or the first direction of spatial rotation to be anti-aligned with a direction of the third polarization state and the second direction of spatial rotation to be anti-aligned with a direction of the fourth polarization state.

In a third implementation, process 500 may include adjusting an orientation of rotating optic 210 in association with controlling a spatial offset between the first polarization state and the second polarization state within bi-directional rotary optical beam 254.

In a fourth implementation, first rotary optical beam 252-1 and second rotary optical beam 252-2 have approximately equal optical power.

In a fifth implementation, the first polarization state is a first linear polarization and the second polarization state is a second linear polarization, where the first linear polarization and the second linear polarization are orthogonal linear polarizations.

In a sixth implementation, the first polarization state is a first circular polarization and the second polarization state is a second circular polarization, where the first circular polarization and the second circular polarization are orthogonal circular polarizations.

In a seventh implementation, polarization convertor 208 includes a set of polarization-sensitive optics such that the third polarization state and the fourth polarization state are final polarization states to be delivered to a workpiece, where the third polarization state and the fourth polarization state are rotationally symmetric orthogonal polarization states.

In an eighth implementation, polarization convertor 208 is a quarter waveplate, and the third polarization state and fourth polarization state are opposing circular polarizations.

In a ninth implementation, polarization convertor 208 is oriented such that the first direction of spatial rotation is aligned with a direction of the third polarization state and such that the second direction of spatial rotation is aligned with a direction of the fourth polarization state.

In a tenth implementation, polarization convertor 208 is oriented such that the first direction of spatial rotation is anti-aligned with a direction of the third polarization state and such that the second direction of spatial rotation is anti-aligned with a direction of the fourth polarization state.

In an eleventh implementation, an orientation of polarization convertor 208 is adjustable in association with selectively aligning or anti-aligning the first direction of spatial rotation with a direction of the third polarization state and the second direction of spatial rotation with a direction of the fourth polarization state.

In a twelfth implementation, rotating optic 210 may be used to introduce an angular shift between first rotary optical beam 252-1 and second rotary optical beam 252-2 in association with causing a spatial offset between the first polarization state and the second polarization state within bi-directional rotary optical beam 254.

In a thirteenth implementation, an orientation of rotation of rotating optic 210 is adjustable in association with controlling the spatial offset.

In a fourteenth implementation, an orientation of rotation of rotating optic 210 is synchronized with translation optics of a cutting head.

In a fifteenth implementation rotary beam symmetrizer 200/400 is implemented in a process head of a materials processing system, an optical delivery fiber, or a splice box.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Some implementations described herein provide a rotary beam symmetrizer (e.g., rotary beam symmetrizer 200, rotary beam symmetrizer 400, and/or the like) capable of converting a (unidirectional) rotary optical beam 250 to a bi-directional rotary optical beam 254 in which some optical power is rotating in one direction and some optical power is rotating in an opposite direction. As described above, bi-directional rotation can be achieved by polarization splitting, inversion of one of the split beams, and polarization recombining. In some implementations, a resulting linear polarization state can be converted into opposite circular polarizations for the two rotational states (e.g., to achieve full rotational symmetry of both beam spatial character and polarization).

The foregoing disclosure provides illustration and description, but is not intended to be exhaustive or to limit the implementations to the precise forms disclosed. Modifications and variations may be made in light of the above disclosure or may be acquired from practice of the implementations.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical device comprising:
   a polarization splitter to split a unidirectional rotary optical beam into a first rotary optical beam having a first polarization state and a second rotary optical beam having a second polarization state,
      wherein the unidirectional rotary optical beam and the second rotary optical beam have optical power with a first direction of spatial rotation, and
      wherein the first direction of spatial rotation is one of a clockwise direction or a counterclockwise direction;
   a reflective element to reverse a parity of the first rotary optical beam in association with causing optical power of the first rotary optical beam to have a second direction of spatial rotation,
      wherein the second direction of spatial rotation is the other of the clockwise direction or the counterclockwise direction; and
   a polarization combiner to, after reversal of the parity of the first rotary optical beam, combine the first rotary optical beam and the second rotary optical beam to create a bi-directional rotary optical beam having the first polarization state and the second polarization state, and
      wherein the bi-directional rotary optical beam has optical power with the first direction of spatial rotation and optical power with the second direction of spatial rotation.

2. The optical device of claim 1, wherein the first rotary optical beam and the second rotary optical beam have approximately equal optical power.

3. The optical device of claim 1, wherein the first polarization state is a first linear polarization and the second polarization state is a second linear polarization,
   wherein the first linear polarization and the second linear polarization are orthogonal linear polarizations.

4. The optical device of claim 1, wherein the first polarization state is a first circular polarization and the second polarization state is a second circular polarization,
   wherein the first circular polarization and the second circular polarization are orthogonal circular polarizations.

5. The optical device of claim 1, further comprising a polarization convertor to:
   convert the first polarization state in the bi-directional rotary optical beam to a third polarization state, and
   convert the second polarization state in the bi-directional rotary optical beam to a fourth polarization state,
   wherein the polarization convertor includes a set of polarization-sensitive optics such that the third polarization state and the fourth polarization state are final polarization states to be delivered to a workpiece, and
   wherein the third polarization state and the fourth polarization state are rotationally symmetric orthogonal polarization states.

6. The optical device of claim 5, wherein the polarization convertor is a quarter waveplate, and the third polarization state and fourth polarization state are opposing circular polarizations.

7. The optical device of claim 5, wherein the polarization convertor is oriented such that the first direction of spatial rotation is aligned with a direction of the third polarization state and such that the second direction of spatial rotation is aligned with a direction of the fourth polarization state.

8. The optical device of claim 5, wherein the polarization convertor is oriented such that the first direction of spatial rotation is anti-aligned with a direction of the third polarization state and such that the second direction of spatial rotation is anti-aligned with a direction of the fourth polarization state.

9. The optical device of claim 5, wherein an orientation of the polarization convertor is adjustable in association with selectively aligning or anti-aligning the first direction of spatial rotation with a direction of the third polarization state and the second direction of spatial rotation with a direction of the fourth polarization state.

10. The optical device of claim 1, further comprising a rotating optic to introduce an angular shift between the first rotary optical beam and the second rotary optical beam in association with causing a spatial offset between the first polarization state and the second polarization state within the bi-directional rotary optical beam.

11. The optical device of claim 10, wherein an orientation of rotation of the rotating optic is adjustable in association with controlling the spatial offset.

12. The optical device of claim 10, wherein an orientation of rotation of the rotating optic is synchronized with translation optics of a cutting head.

13. The optical device of claim 1, wherein the optical device is implemented in:
   a process head of a materials processing system,
   an optical delivery fiber, or
   a splice box.

14. A method, comprising:
   splitting a unidirectional rotary optical beam into a first rotary optical beam having a first polarization state and a second rotary optical beam having a second polarization state,
      wherein the unidirectional rotary optical beam and the second rotary optical beam have optical power with a first direction of spatial rotation, and
      wherein the first direction of spatial rotation is one of a clockwise direction or a counterclockwise direction;
   causing optical power of the first rotary optical beam to have a second direction of spatial rotation, the second direction of spatial rotation being the other of the clockwise direction or the counterclockwise direction; and
   combining, after causing the optical power of the first rotary optical beam to have the second direction of spatial rotation, the first rotary optical beam and the second rotary optical beam to create a bi-directional rotary optical beam,
      wherein the bi-directional rotary optical beam has both the first polarization state and the second polarization state, and
      wherein the bi-directional rotary optical beam has optical power with the first direction of spatial rotation and optical power with the second direction of spatial rotation.

15. The method of claim 14, further comprising:
   converting the first polarization state in the bi-directional rotary optical beam to a third polarization state, and
   converting the second polarization state in the bi-directional rotary optical beam to a fourth polarization state,
      wherein the third polarization state and the fourth polarization state are rotationally symmetric polarization states.

16. The method of claim 15, wherein the third polarization state and fourth polarization state are opposing circular polarizations.

17. The method of claim 15, further comprising selectively causing either:
   the first direction of spatial rotation to be aligned with a direction of the third polarization state and the second direction of spatial rotation to be aligned with a direction of the fourth polarization state; or
   the first direction of spatial rotation to be anti-aligned with a direction of the third polarization state and the second direction of spatial rotation to be anti-aligned with a direction of the fourth polarization state.

18. The method of claim 14, further comprising adjusting an orientation of a rotating optic in association with controlling a spatial offset between the first polarization state and the second polarization state within the bi-directional rotary optical beam.

19. A system comprising:
   an optical input to receive an input rotary optical beam having optical power with a first direction of spatial rotation,
      wherein the first direction of spatial rotation is one of a clockwise direction or a counterclockwise direction;
   a splitter to split the input rotary optical beam into a first rotary optical beam and a second rotary optical beam,
      wherein the first rotary optical beam has a first linear polarization state, and
      wherein the second rotary optical beam has a second linear polarization state and optical power with the first direction of spatial rotation,
         wherein the first linear polarization state and the second linear polarization state are orthogonal linear polarization states;
   a set of reflectors to cause the optical power of the first rotary optical beam to have a second direction of spatial rotation,
      wherein the second direction of spatial rotation is the other of the clockwise direction or the counterclockwise direction; and
   a combiner to receive the first rotary optical beam and the second rotary optical beam and output an output rotary optical beam,
      wherein the output rotary optical beam has the first linear polarization state and the second linear polarization state, and
      wherein the output rotary optical beam has optical power with the first direction of spatial rotation and optical power with the second direction of spatial rotation.

20. The system of claim 19, further comprising a convertor to:
   convert the first linear polarization state in the output rotary optical beam to a third linear polarization state, and
   convert the second linear polarization state in the output rotary optical beam to a fourth linear polarization state,
      wherein the third linear polarization state and the fourth linear polarization state are rotationally symmetric polarization states.

\* \* \* \* \*